United States Patent [19]
Hartmann et al.

[11] Patent Number: 5,528,837
[45] Date of Patent: Jun. 25, 1996

[54] ADJUSTABLE MAGNETIC COMPASS

[75] Inventors: Jerome Hartmann, Carlisle; John E. Schenken; Charles A. Haas, both of Des Moines, all of Iowa

[73] Assignee: Cobbs Manufacturing Company, Des Moines, Iowa

[21] Appl. No.: 538,465

[22] Filed: Oct. 2, 1995

Related U.S. Application Data

[63] Continuation of Ser. No. 33,674, Mar. 16, 1993, abandoned.

[51] Int. Cl.⁶ .................................................... G01C 17/38
[52] U.S. Cl. ............................................... 33/356; 33/364
[58] Field of Search .................................. 33/355 R, 349, 33/361, 358, 359, 356, 357, 364, 1 D

[56] References Cited

U.S. PATENT DOCUMENTS

| | | |
|---|---|---|
| 1,195,300 | 8/1916 | Wagner . |
| 1,401,205 | 12/1921 | Suter . |
| 1,794,964 | 3/1931 | Knutson . |
| 2,358,589 | 9/1944 | Piffath ........................................ 33/364 |
| 2,506,885 | 5/1950 | Noxon . |
| 2,857,679 | 10/1958 | Bleu ........................................ 33/356 X |
| 3,177,591 | 4/1965 | Jolley ........................................ 33/356 |
| 3,813,792 | 6/1974 | Jarvenpaa ................................... 33/356 |
| 3,919,782 | 11/1975 | Vaucher .................................... 33/349 |
| 4,438,568 | 3/1984 | Kramer et al. ............................. 33/348 |
| 4,899,453 | 2/1990 | Bhat et al. ................................. 33/348 |
| 4,920,656 | 5/1990 | Cross ....................................... 33/355 R |

FOREIGN PATENT DOCUMENTS

| | | | |
|---|---|---|---|
| 0659320 | 1/1987 | Switzerland .......................... 33/355 R |

OTHER PUBLICATIONS

*The Boy Scout Handbook,* Robert C. Birkby, Tenth Edition, pp. 186–192, 1990.
"Weems Marine Navigation", 1940, p. 39.
"Pocket Ref", Thomas J. Glover, Sequoia Publishing Inc., 1989, p. 360.

*Primary Examiner*—Thomas B. Will
*Attorney, Agent, or Firm*—Dick and Harris

[57] ABSTRACT

An adjustable magnetic compass for adjustably compensating for the magnetic variation between magnetic north and map north. The adjustable compass includes a compass dial having directional indicia applied thereto, and a lubber line for operative alignment relative to the directional indicia. The lubber line can be rotatably adjusted relative to the directional indicia so as to visually compensate for the magnetic variation between magnetic north and map north with respect to the geographic location in which the adjustable magnetic compass is to be located.

8 Claims, 2 Drawing Sheets

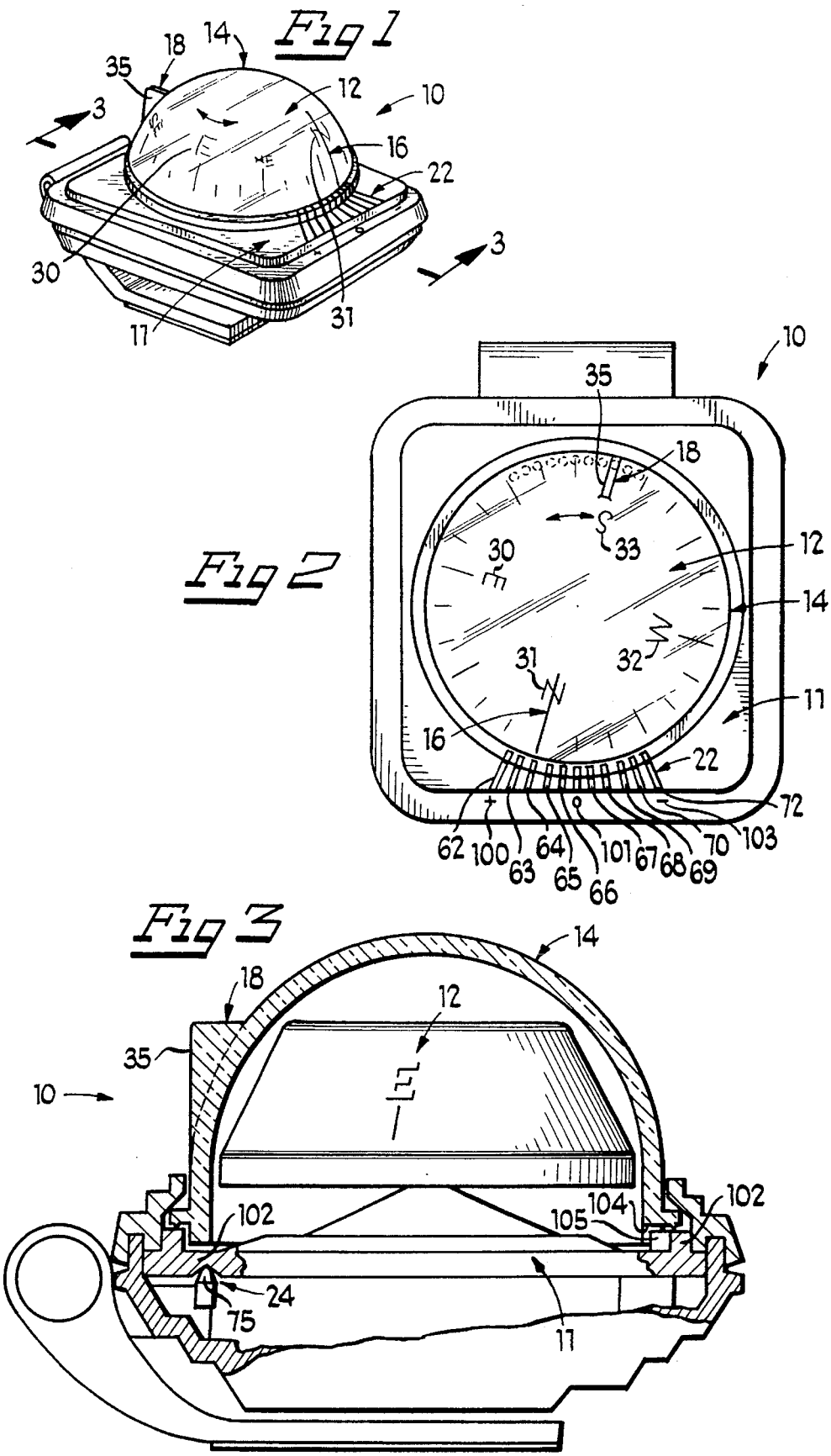

ADJUSTABLE MAGNETIC COMPASS

This is a continuation of application Ser. No. 08/033,674, filed Mar. 16, 1993, now hereby abandoned.

BACKGROUND OF THE INVENTION

1. Field of the Invention

This invention relates generally to compasses, and more particularly, to an adjustable magnetic compass for adjustably compensating for the magnetic variation between magnetic north and map north.

2. Background Art

Compasses, and more particularly magnetic compasses for use in finding direction, have been known in the art for many, many years. Indeed, one example of such a prior art compass comprises a float-type magnetic compass having a compass dial with indicia representative of the north, south, east and west directions, as well as compass points therebetween, operatively disposed on the face of the compass dial. The compass dial is attached to a two-pole magnet which is pivoted about a vertical axis with its poles in the horizontal plane. Accordingly, the magnet will align itself with magnetic north—which differs from true north by the variation angle.

Such prior art magnetic compasses further include a stationary lubber line associated with the indicia on the compass dial. Accordingly, the specific indicia which aligns closest with the lubber line serves to indicate the directional positioning of the compass with respect to magnetic north.

Although such prior art compasses have been relatively accurate with respect to identifying the directional positioning of the compass with respect to magnetic north, they have been deficient with respect to properly identify true, or map north. For example, many of such magnetic float-type compasses have been used in automobiles for purposes of identifying the direction of travel of the vehicle. However, the directional layout of streets in most major cities, and more particularly the directional layout of north bound streets, are typically based on true north, as opposed to magnetic north. Accordingly, unless the magnetic compass is to be used within a city whose longitudinal positioning is substantially in-line with respect to both true north and magnetic north, the compass will not accurately reflect the direction of travel of the vehicle—with respect to true north.

SUMMARY OF THE INVENTION

The present invention comprises an adjustable magnetic compass for adjustably compensating for the magnetic variation between magnetic north and map north. The compass includes a housing for operatively encasing a compass dial wherein the compass dial includes a plurality of indicia representative of directional positioning of the adjustable magnetic compass. A lubber line is operatively associated with the compass dial for operative alignment relative to the indicia on the compass dial in order to indicate the directional positioning of the compass. Means are provided for adjusting the lubber line relative to the indicia, to, in turn, visually compensate for the magnetic variation between magnetic north and map north relative to the geographic location of the adjustable magnetic compass.

In the preferred embodiment of the invention, the adjustable magnetic compass includes means for instructing an operator as to an appropriate amount of adjustment of the lubber line necessary to compensate for the magnetic variation between magnetic north and map north in a particular geographic location.

In this preferred embodiment, the instructing means comprises a geographic chart which visually identifies specific geographical regions. Each of such regions include means for visually representing the appropriate amount of adjustment of the lubber line necessary to compensate between magnetic north and map north when the adjustable compass is located within a particular geographic location corresponding to one of the specific geographical regions.

In a preferred embodiment of the invention, the adjustable magnetic compass further includes means for identifying whether the appropriate amount of adjustment to the lubber line has indeed been accomplished. Such identifying means comprise a plurality of projections operatively attached to the housing and positioned relative to the lubber line. Each of these projections correspond to the visually represented means which are associated with each of the specific geographical regions on the geographic chart.

In this preferred embodiment of the invention, the adjustable magnetic compass further includes means for releasably securing the lubber line in a position relative to a specific one of the projections. The releasable position securement means comprise a plurality of recessed portions integrally associated with the housing means and at least one boss member operatively positionable in releasable cooperation with each of the plurality of recessed portions. Each of the recessed portions correspond to a related one of the plurality of projections.

Also, in the preferred embodiment of the invention, the lubber line adjustment means includes a grasping member operatively associated with the lubber line. It is contemplated that the lubber line adjustment means comprise a rotatable dome member, and/or that the dome member cooperate with a grasping element for facilitating rotation thereof.

The present invention further comprises a method for adjusting a magnetic compass to compensate for the magnetic variation between magnetic north and map north, wherein the compass includes an adjustable lubber line operatively associated with a compass dial having indicia representative of north, south, east and west directions. The method comprises the steps of 1) positioning the compass in a map north direction with respect to a specific geographic region in which the compass is to be used; and 2) adjusting the lubber line for operative alignment with the indicia on the compass dial which is representative of the north direction.

In the preferred embodiment of the invention, the method further comprises the step of identifying the specific geographic region in which the compass is to be located prior to the step of adjusting the lubber line.

In this embodiment, the method further includes the step of determining the amount of adjustment to be made to the lubber line necessary to compensate for the magnetic variation between magnetic north and map north relative to the specific region in which the compass is to be located. Such a determination as to the amount of adjustment is a function of the magnetic deviation associated with magnetic north and the specific geographic region in which the compass is to be located.

Also in this preferred embodiment of the invention, the method for adjusting the magnetic compass further includes the step of providing predetermined increments of adjustment operatively associated with the lubber line.

The method further includes the step of consulting a geographic chart having indicia associated with specific geographical regions displayed on the chart. The indicia is representative of the appropriate amount of adjustment of the lubber line necessary to compensate between magnetic north and map north.

In this preferred embodiment of the invention, the method further includes the step of matching the specific geographical region in which the compass is to be used with a corresponding one of the specific geographic regions on the geographical chart.

The invention further includes the step of moving the lubber line to one of the predetermined increments associated therewith. Such amount of movement corresponds to the indicia associated with the specific geographical region on the chart in which the compass is to be used.

BRIEF DESCRIPTION OF THE DRAWINGS

For a better understanding of the present invention, reference may be had to the accompanying drawings in which:

FIG. 1 is a perspective view of an embodiment of the present invention;

FIG. 2 is a top view of the embodiment of the present invention;

FIG. 3 is an enlarged cross-sectional view of the embodiment of the present invention taken generally along lines 3—3 of FIG. 1;

DETAILED DESCRIPTION OF THE DRAWINGS

Figure 4:
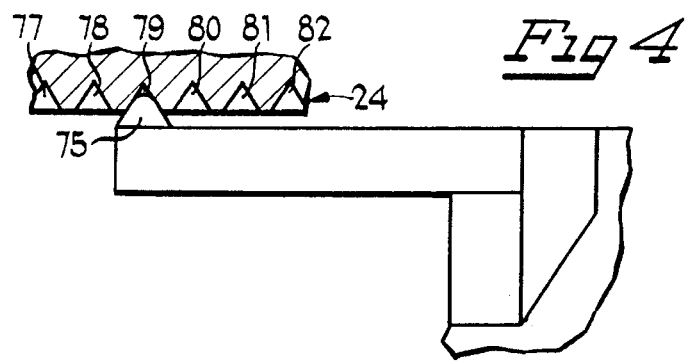
FIG. 4 is a fragmentary cross-sectional view of the releasable position securement means of the embodiment of the present invention.

While this invention is susceptible of embodiment in many different forms, there is shown in the drawings and will herein be described in detail, one specific embodiment with the understanding that the present disclosure is to be considered as an exemplification of the principles of the invention and is not intended to limit the invention to the embodiment illustrated.

Adjustable compass 10 is shown in FIGS. 1 through 3 as comprising housing 11, compass dial 12, dome member 14, lubber line 16 (FIG. 1 and FIG. 2), lubber line adjustment means 18, instructing means 20 (FIG. 5), identifying means 22 (FIG. 1 and FIG. 2) and releasable position securement means 24 (FIG. 4). Compass dial 12 includes indicia, such as indicia 30 through 33 (FIG. 1 and FIG. 2), each of which are representative of the directional positioning of adjustable compass 10. Lubber line 16, which is attached to dome member 14, is associated with compass dial 12 for operative alignment relative to the indicia on the compass dial in order to indicate the directional positioning of adjustable compass 10.

Lubber line adjustment means 18 is shown in FIGS. 1 through 3 as including grasping member 35. As will be explained in greater detail, grasping member 35 can be manipulated in the direction of the arrows (FIG. 1), to, in turn, selectively rotate the positioning of lubber line 16 relative to a specific one of indicia, such as indicia 30 through 33, as well as to selectively position the lubber line into operative alignment with identifying means 22. Accordingly, such selective positioning of the lubber line will serve to visually compensate for the magnetic variation between magnetic north and map north relative to the geographic location in which adjustable compass 10 is to be used in.

Although grasping member 35 facilitates operative positioning of lubber line 16, it is also contemplated that such positioning be accomplished merely by rotating dome member 14—with or without utilization of the grasping member. However, it is also contemplated that if grasping member 35 is to be employed, that lubber line 16 may be alternatively operatively attached to the grasping member so as to enable direct cooperation therebetween.

Figure 5:
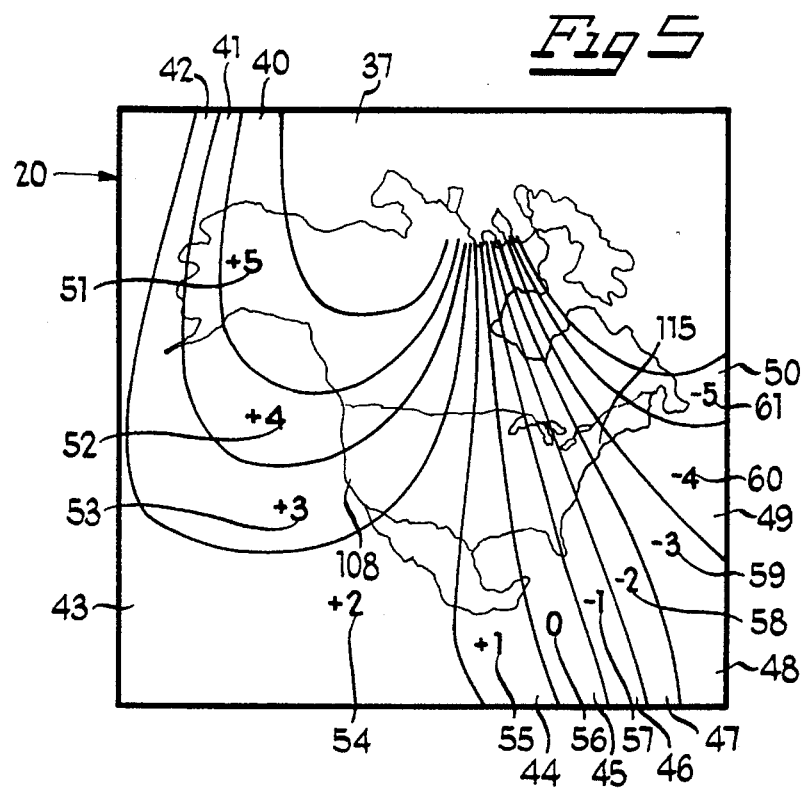
FIG. 5 is a sectional view of the instructing means of the embodiment of the present invention.

Instructing means 20 is shown in FIG. 5 as including geographic chart 37 which visually identifies specific geographical regions, such as geographical regions 40 through 50. In addition, and as will be explained in greater detail, each of the geographical regions include means 51 through 61 for visually representing the appropriate amount of adjustment to be made to lubber line 16 (FIG. 2) in order to compensate between magnetic north and map north.

Identifying means 22 is shown in FIG. 2 as including a plurality of projections 62 through 72 (each representing predetermined magnetically compensating increments) operatively positioned on housing 11 and positioned relative to lubber line 16. Each of these projections correspond to specific ones of the means 51 through 61 (FIG. 5) for visually representing the appropriate amount of adjustment. For example, the "+4" indicia (means 52), corresponds to projection 63. Indeed, if adjustable compass is to be situated anywhere within geographical region 41, a user of the compass would simply rotate the lubber line in the direction of the "+" symbol 100 (FIG. 2) on housing 11, until lubber line 16 is aligned with corresponding projection 63. Once this is accomplished, adjustable compass 10 will have been adjusted to compensate between magnetic north and map north—with respect to that specific geographical region. Although geographic chart 37 is shown as being separated from the compass body, it is also contemplated that the chart be operatively applied to a portion of the compass, such as on housing 11.

Figure 6:
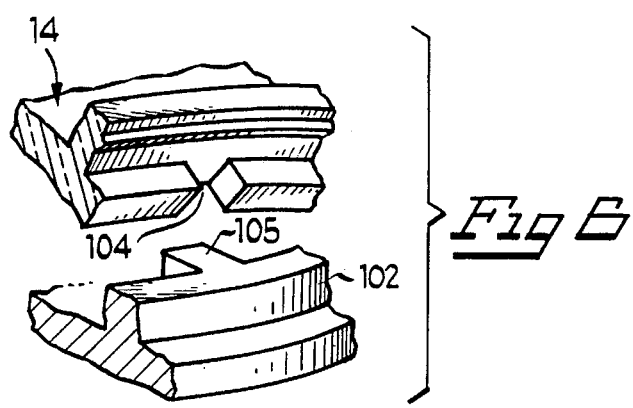
FIG. 6 is a fragmentary cross-sectional view of the rack ring and the dome member of the embodiment of the present invention.

Releasable position securement means 24 is shown in FIG. 3 and FIG. 4 as including boss member 75 and a plurality of recessed regions, such as recessed regions 77 through 82 (FIG. 4). Each of the recessed regions, in cooperation with the boss member, serve to releasably secure lubber line 16, and, in turn, dome member 14, in its operative adjusted position until further adjustment of the lubber line (such as when relocating adjustable compass 10 to a different geographical region) is desired. The releasable position securement means acts similar to a bidirectional ratchet mechanism wherein the boss member would serve as a stationary pawl, and the plurality of recessed regions would serve as a movable rack located on a rack ring 102 (FIGS. 4 through 6). As shown in FIG. 3 and FIG. 4, boss member 75 of position securement means 24 is operatively attached within housing 11, and the plurality of recessed regions, such as recessed regions 77 through 82, are operatively positioned on rack ring 102 (FIG. 3 and FIG. 4). As shown in FIG. 6, rack ring 102 is attached to dome member 14 through intercooperation between notch portion 104 of dome member 14 and tab member 105 of the rack ring. As a result of such cooperation, rack ring 102 will rotate together with dome member 14 to, in turn, enable boss member 75 to releasably seat within one of the recessed regions rotatably positioned into alignment with the specific one of the projections 62 through 72 (FIG. 2) of which the lubber line is to be rotatably positioned into operative alignment with.

Actual adjustment of adjustable compass 10 (after conventional preliminary adjustments are made to compensate for magnetic interference typically prevalent within the immediate area in which the compass is to be mounted—such as within an automobile) can be accomplished by first referring to geographic chart 37 and then identifying the specific geographical region, such as geographical regions 40 through 50 (FIG. 5) in which adjustable compass 10 is, or is going to be, located in. Once the specific geographical region is identified, the appropriate amount of adjustment of lubber line 16 can be determined by observing the specific indicia associated with the relevant geographical region and then rotating the lubber line into operative alignment with a corresponding one of projections 62 through 72—as dictated by the associated indicia.

For example, if adjustable compass 10 is to be used within the State of California, a user would look to geographic chart 37 and identify the geographical region 42 in which California 108 is located. Once this is done, the user then identifies the indicia 53 associated with that geographical region. Such indicia would then serve to visually represent the appropriate amount of incremental movement to be made to lubber line 16, with respect to projections 62 through 72 on housing 11, to, in turn, compensate between magnetic north and map north.

Inasmuch as the indicia associated with the geographical region 42 in which California 108 is located is depicted as a "+3," such indicia would inform a user that lubber line 16 would have to be rotatably adjusted into alignment with the third incremental projection 64 (positioned between projection 67 which is aligned with the "0" symbol 101 (FIG. 2) on housing 11, and projection 62 which is aligned with the "+" symbol 100 on housing 11). If, on the other hand, adjustable compass 10 is to be located within a geographical region designated by a negative number, such as New York 115, then lubber line 16 would be rotated into operative alignment with the projection 70 located "3" increments away from projection 67 (aligned with the "0" symbol 101 on housing 11), and, in a direction towards projection 72, which is aligned with the "−" symbol 103 on the housing. After appropriate adjustment has been made, adjustable compass 10 will have been adjusted to compensate for the magnetic variation between magnetic north and map north for that specific geographical region. If adjustable compass 10 requires further adjustment (e.g., when driving an automobile through and across various geographical regions, such as those geographical regions identified in Chart 37) the user simply follows the same procedures for adjustment, as identified above, for the specific geographical region adjustable compass 10 is to be relocated in.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. An adjustable magnetic compass for adjustably compensating for the magnetic variation between magnetic north and map north, the adjustable magnetic compass comprising:

a geographic chart visually identifying a plurality of specific geographic regions, each geographic region containing a unique indicia therewithin specifying a required amount of adjustment to be made when the adjustable magnetic compass is physically within the geographic region;

a housing for operatively encasing a compass dial wherein the compass dial includes a plurality of indicia representative of directional positioning of the adjustable magnetic compass;

a lubber line operatively associated with the housing for visual referencing relative to the indicia on the compass dial in order to indicate the directional positioning of the adjustable magnetic compass;

means for adjusting the lubber line relative to the indicia on the compass dial, to, in turn, visually compensate for the magnetic variation between magnetic north and map north relative to the physical geographic location of the adjustable magnetic compass; and means for identifying that an appropriate amount of adjustment to the lubber line has been accomplished, the identifying means comprising a plurality of projections fixedly attached to the housing and referenced relative to the lubber line, wherein each of the projections are representative of a corresponding one of the unique indicia associated with the particular geographic region on the geographic chart and, accordingly, the geographic region where the adjustable magnetic compass is physically located.

2. The adjustable magnetic compass according to claim 1, wherein each geographic region within the geographic chart is identified by a numeral corresponding to a specific one of the projections of the housing.

3. The adjustable magnetic compass according to claim 1 further including means for releasably securing the lubber line in a position relative to a specific one of the plurality of projections.

4. The adjustable magnetic compass according to claim 1 further including means for releasably securing the lubber line in operative aligned position with a specific one of the indicia on the compass dial.

5. The adjustable magnetic compass according to claim 1 wherein the lubber line adjustment means includes a grasping member operatively associated with the lubber line.

6. The adjustable magnetic compass according to claim 1 wherein the lubber line is attached to a rotatable dome member;

the dome member being operatively attached to the housing of the adjustable compass and positioned over and about at least a portion of the compass dial;

the lubber line adjustment means comprising the dome member.

7. The adjustable magnetic compass according to claim 6 wherein the dome member includes a grasping element for facilitating rotation of the dome member.

8. A method for adjusting a magnetic compass to compensate for the magnetic variation between magnetic north and map north, wherein the compass includes an adjustable lubber line operatively associated with a compass housing for visual referencing relative to compass dial having indicia representative of north, south, east and west directions, and a plurality of projections fixedly attached to the compass housing and referenced relative to the lubber line, each of the projections being representative of a corresponding one of unique indicia within a geographic region on a geographic chart, the method comprising the steps of:

identifying the specific geographic region in which the compass is physically located on the geographic chart;

matching the specific indicia within the geographic region in which the compass is physically located with its corresponding projection on the compass housing; and adjusting the lubber line to align the lubber line with the matched projection corresponding to the indicia identified within the specific geographic region in which the compass is physically located.

\* \* \* \* \*